United States Patent [19]

Trudeau

[11] 4,445,801

[45] May 1, 1984

[54] DISMANTABLE JOINT ARRANGEMENT

[76] Inventor: Luc Trudeau, 880, Carleton St., Chambly, Quebec, Canada, J3L 2X9

[21] Appl. No.: 425,856

[22] Filed: Sep. 28, 1982

[51] Int. Cl.$^3$ .............................................. F16B 7/18
[52] U.S. Cl. .................................... 403/219; 403/292
[58] Field of Search ....................... 403/217, 219, 292

[56] References Cited

U.S. PATENT DOCUMENTS

| | | |
|---|---|---|
| 1,066,212 | 7/1913 | Meltzer . |
| 3,351,365 | 11/1967 | Bickl .................................. 403/292 |
| 3,387,868 | 6/1968 | Borden ................................ 287/51 |
| 3,779,657 | 12/1973 | Kostick .............................. 403/217 |

FOREIGN PATENT DOCUMENTS 165608  7/1921  United Kingdom ................ 403/217

*Primary Examiner*—Andrew V. Kundrat
*Attorney, Agent, or Firm*—Swabey, Mitchell, Houle, Marcoux & Sher

[57] ABSTRACT

The invention is concerned with a dismantable joint arrangement comprising three pairs of spaced-apart parallel members, which are arranged relative to one another such that the members of each pair cross the members of the other pairs in abutting engagement therewith and any one pair of members has a respective second pair of members interposed therebetween and a respective third pair of members adjoined thereto and interposed between the members of the respective second pair. At least two dowell-type coupling elements are associated with each pair for positioning the members thereof against those interposed therebetween. The coupling elements are removably inserted in corresponding holes formed at the crossings of the members and are slidably frictionally engaged in the holes so as to be retained therein by frictional force while being slidably removable by the application of manual force. The members of the respective third pair cooperate with the members of the one pair and the respective second pair to stabilize the relative position of these members and the coupling elements associated with the respective second pair releasably lock the members of the respective third pair in place to thereby provide a rigid and secure joint for all the members. The joint arrangement of the invention may be easily dismantled by slidably removing at least one of the coupling elements associated with the respective second pair so as to release at least one of the members of the respective third pair and thereby enable the remaining members to be taken apart.

14 Claims, 7 Drawing Figures

DISMANTABLE JOINT ARRANGEMENT

BACKGROUND OF THE INVENTION

The present invention relates to improvements in joint arrangements. More particularly, the invention is concerned with a dismantable joint arrangement for joining members in such a way that they are held together in a rigid and stable relationship in the assembled position, but yet can be easily disassembled for convenient shipping or storage.

In U.S. Pat. No. 3,387,868, there is described a multiple member joining arrangement for furniture and the like. The joining arrangement comprises at least three subdivided members extending toward and through one another to intersect at a common joint, each member including at least three sets of submembers, with at least two submembers in each set. Both the sets and submembers are spaced from and parallel with each other at the joint. The submembers of each member extend through the space between the sets and submembers of the other members in physical contact at the joint to provide a large contact area. Adhesive means such as glue is utilized in securing these submembers where they are in physical contact, thereby providing a high strength joint with good adhesion due to the greater adhesive area. Since adhesive is employed, it is apparent that this type of joint arrangement requires a large number of submembers in order to provide the necessary large surface area for adhesive, at the joint.

Similar joint arrangements are also disclosed in U.S. Pat. Nos. 1,066,212 and 3,779,657. In the former patent, instead of adhesive, wires are used as fastening means, which extend through overlapping or intersecting rods; since the wires are forced through bores of slightly smaller cross-section, the rods are connected to each other in such a way that they cannot be separated. In the latter patent, on the other hand, which discloses a structural joint comprising three pairs of spaced parallel beams, the beams of any one pair lying exterior to the beams of a second included pair and interior to the beams of a third pair, tension members such as threaded rods with nuts join the beams, of each pair and bias them together against the included beam pair. These tension members pass through an intersection void defined by the three pairs of beams and the members extending between the beams of each pair are in skewed relationship to those of the other pairs.

It is apparent that in both the above U.S. Pat. Nos. 1,066,212 and 3,387,868, once the joint arrangement has been assembled it cannot be dismantled, whereas in the case of U.S. Pat. No. 3,779,657 a special tool such as a wrench or a pair of pliers is needed to disengage the nuts from their respective rods in order to disassemble the joint. In this respect, it is often desirable particularly in the field of furniture to arrange frame elements and leg elements of a piece of furniture in a way such that they may be easily assembled without the need of nails, screws, adhesive or the like and/or without the use of special tools, while still presenting a rugged and sturdy article of furniture in the assembled position, and yet can be easily disassembled to provide a knocked-down structure for convenient shipping or storage.

SUMMARY OF THE INVENTION

It is therefore an object of this invention to provide a joint arrangement which is rigid, strong and simple to assemble and which can also be easily disassembled.

In accordance with the present invention, there is thus provided a dismantable joint arrangement comprising three pairs of spaced-apart parallel members, which are arranged relative to one another such that the members of each pair cross the members of the other pairs in abutting engagement therewith and any one pair of members has a respective second pair of members interposed therebetween and a respective third pair of members adjoined thereto and interposed between the members of the respective second pair. At least two dowell-type coupling elements are associated with each pair for positioning the members thereof against those interposed therebetween. The coupling elements are removably inserted in corresponding holes formed at the crossings of the members and are slidably frictionally engaged in the holes so as to be retained therein by frictional force while being slidably removable by the application of manual force. The members of the respective third pair cooperate with the members of the one pair and the respective second pair to stabilize the relative position of these members and the coupling elements associated with the respective second pair releasably lock the members of the respective third pair in place to thereby provide a rigid and secure joint for all the members.

The joint arrangement of the invention may be easily dismantled by slidably removing at least one of the coupling elements associated with the respective second pair so as to release at least one of the members of the respective third pair and thereby enable the remaining members to be taken apart.

By the expression "dowell-type coupling element", there is meant an elongated member adapted to be fitted into corresponding holes in abutting pieces to locate the pieces relative to one another. The coupling elements used in the context of the present invention need not necessarily be of circular cross-section nor be made of wood as in the case of conventional dowel pins; indeed, they may have any desired cross-section such as, for example, rectangular, square or even triangular cross-section, and may be made of any suitable material, such as metal or plastic. The holes into which these coupling elements are inserted are of slightly greater cross-section so as to enable the coupling elements to be slidably frictionally engaged therein. Thus, the insertion of the coupling elements into their corresponding holes as well as their removal therefrom can be easily effected using directly one's fingers or with the assistance of a small mallet; the elements once inserted in the holes will not slide out but rather will remain therein due to friction.

According to a preferred embodiment, there are two coupling elements associated with each pair of members, and those associated with the respective second pair are each inserted in through-holes formed in the members of the respective second pair and registering with through-holes formed in the members of the respective third pair whereby to extend entirely through these members. On the other hand, the coupling elements associated with each of the one pair of respective third pair are inserted in blind-holes formed in the members of their associated pair and registering with through-holes formed in the members of the pair interposed between the associated pair, whereby each coupling element extends partially through the members of its associated pair and entirely through the interposed member. Thus, in this preferred embodiment, four coupling elements are hidden from the view and only two are apparent, that is, those two which are associated with the respective second pair and serve to releasably lock the respective third pair of members into place. This feature greatly contributes to the aesthetic look of the joint arrangement.

The joint arrangement of the invention is particularly useful in joining together components of articles of furniture, such as chairs, tables, shelves and the like, as well as structural elements used in the construction of kiosks and fences, for instance. It may also be employed in children's toy constructions, such as animals, cars, etc.

BRIEF DESCRIPTION OF THE DRAWINGS

Further advantages and features of the invention will become more apparent from the following detailed description of preferred embodiments thereof as illustrated by way of examples in the accompanying drawings, wherein.

DESCRIPTION OF PREFERRED EMBODIMENTS

Figure 1:
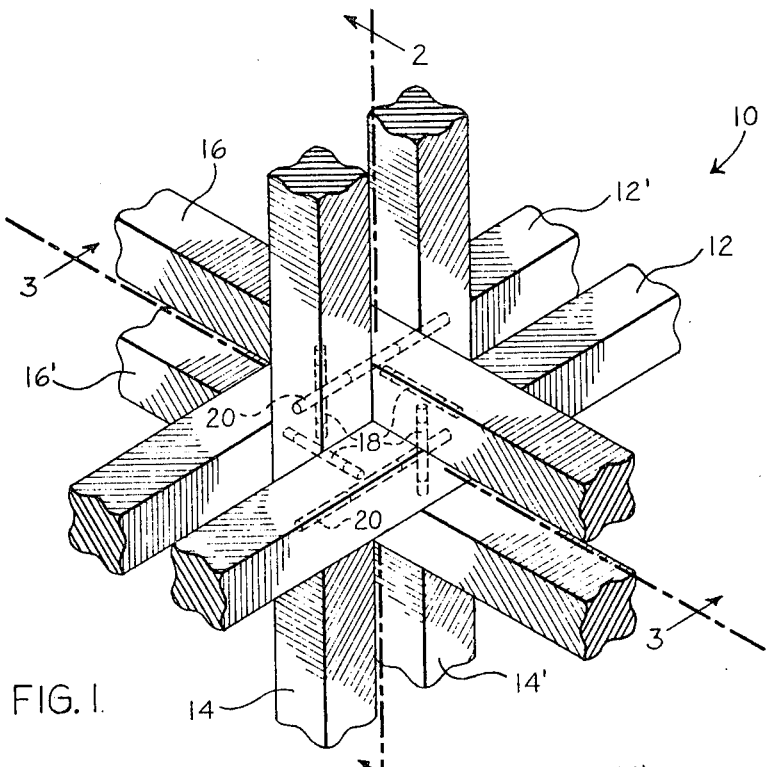
FIG. 1 is a fragmentary perspective view of a joint arrangement according to a preferred embodiment of the invention.

Referring first to FIG. 1, there is illustrated a joint arrangement generally designated by reference numeral 10 and shown as comprising three pairs of spaced-apart parallel members 12,12' 14,14' and 16,16', each member being elongated and having a square cross-section. These three pairs of members are arranged relative to one another such that the members of each pair cross the members of the other pairs in abutting engagement therewith and any one pair of members, for example pair 12,12', has a respective second pair of members, as pair 14,14', interposed therebetween and a respective third pair of members, as pair 16,16', adjoined thereto and interposed between the members of the respective second pair. If pair 14,14' is taken as reference, it has a pair of members 16,16' interposed therebetween and another pair of members 12,12' adjoined thereto and interposed between the members of pair 16,16'. Similarly, the pair of members 16,16' has a pair of members 12,12' interposed therebetween and another pair of members 14,14' adjoined thereto and interposed between the members of pair 12,12'. Such arrangement of the members contributes to the rigidity and stability of the joint.

Coupling elements 18 and 20 in the form of dowell pins having a circular cross-section are used for positioning the members of each pair against those interposed therebetween, there being two coupling elements associated with each pair. These coupling elements are inserted in corresponding holes of slightly greater cross-section which are formed at the crossings of the members, so as to be slidably frictionally engaged therein. As shown, the coupling elements associated with each pair of members are parallel with one another and the coupling elements associated with any one pair lie in a different plane in relation to those associated with the other pairs.

The coupling elements 18 which are associated with pairs 12,12' and 16,16' and which are of smaller length compared to the coupling elements 20 associated with pair 14,14' are disposed on either sides of the respective pair 16,16' and 14,14' whereas the coupling elements 20 are disposed on either side of pair 12,12'.

It should be noted that since the coupling elements do not constitute fastening means per se, the pairs of members 12,12' and 14,14' are free to pivot relative to one another about the coupling elements 18 which extend thereinto, in the absence of members 16,16'. Thus, the members 16,16' serve to stabilize the relative position of members 12,12' and 14,14' and, since these are joined to members 12,12' by means of the coupling elements 18, they prevent the members 12,12' from being separated from the members 14,14' interposed therebetween. The coupling elements 20, on the other hand, serve to releasably lock the members 16,16' in place. As a result, a rigid and secure joint is provided for all the members.

Figure 2:
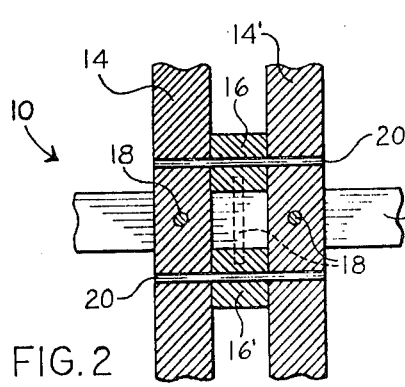
FIG. 2 is a sectional view taken along line 2—2 of FIG. 1.
Figure 3:
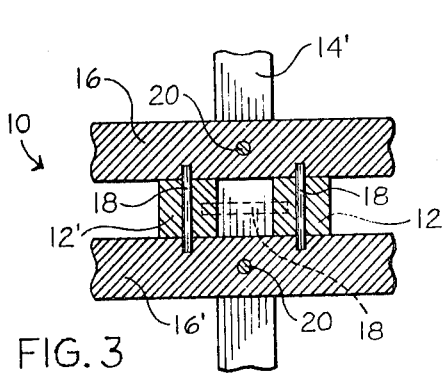
FIG. 3 is a sectional view taken along line 3—3 of FIG. 1.

As best shown in FIG. 3, the coupling elements 18 are inserted in blind-holes which are formed in members 12,12' and 16,16' and which register with through-holes formed in the respective interposed members 14,14' and 12,12' such that the coupling elements 18 extend partially through the members of their associated pairs 12,12' and 16,16' and entirely through the members of their respective interposed pairs 14,14' and 12,12'. On the other hand, the coupling elements 20 are inserted in through-holes which are formed in members 14,14' and which register with through-holes formed in the interposed members 16,16' so as to extend entirely through these members, as best shown in FIG. 2. Thus, four of the six coupling elements used in the joint arrangement 10 are hidden from the view, namely the coupling elements 18, whereas only two are apparent, namely the coupling elements 20, when viewed in a direction along the length of members 12,12'.

Figure 2A:
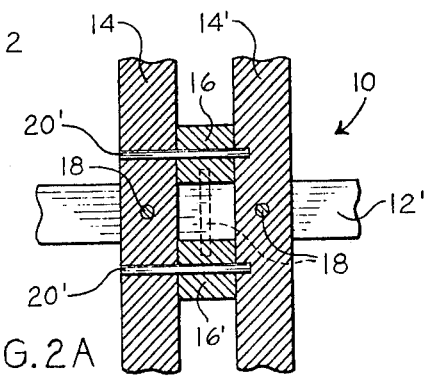
FIG. 2A is a view similar to that of FIG. 2, but illustrating a variant thereof.

In the embodiment shown in FIG. 2A, shorter coupling elements 20' are used which are inserted in through-holes formed in member 14 and in blind-holes formed in the opposite member 14', these holes registering with through-holes formed in the interposed members 16,16'. The coupling elements 20' thus extend entirely through member 14 as well as through the interposed members 16,16' and partially through member 14'. This embodiment has the advantage of providing no apparent outer openings in member 14'; the outer openings in member 14 which are apparent to the view and through the coupling elements 20' are inserted during assembly of the joint or removed during the disassembly thereof can still be hidden from the view by orienting the joint arrangement such that they do not face one's general view, thereby enhancing the aesthetic aspect of the joint.

Figure 3A:
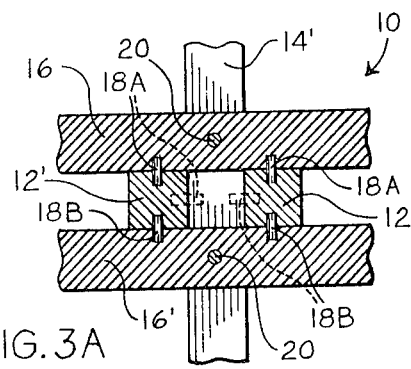
FIG. 3A is a view similar to that of FIG. 3, but illustrating a variant thereof.

With respect to the embodiment shown in FIG. 3A, instead of having two coupling elements 18 associated with each pair of members 12,12' and 16,16' as in FIG. 3, there are two pairs of coupling elements 18A,18B associated therewith; in other words, there are altogether four coupling elements associated with each of pairs 12,12' and 16,16'. The coupling elements 18A,18B are inserted in blind-holes which are formed in members 12,12' and 16,16' and which register with corresponding blind-holes formed in the respective interposed members 14,14' and 12,12'. Thus, the coupling elements 18A,18B extend partially through the members of their associated pairs 12,12' and 16,16' as well as through the members of their respective interposed pairs 14,14' and 12,12'.

With respect to the coupling elements 18, it should be noted that although these are shown as only partially extending through the members of their associated pairs 12,12' and 16,16', they may also extend entirely therethrough in the same way as the coupling elements 20 extend entirely through members 14,14'. This variant is of course contemplated by the present invention.

Figure 5:
FIG. 5 is an enlarged side elevation view of a coupling element as used in the joint arrangement of FIG. 1.

In order to assemble the joint arrangement 10 illustrated in FIG. 1, two coupling elements 18 may first be inserted in the through-holes provided in members 14,14' so as to protrude from either side of each member. Members 12,12' are then adjoined to members 14,14' such that the protruding portions of the coupling elements 18 are inserted the blind-holes provided in members 12,12', thereby positioning the members 12,12' against members 14,14'. At this stage of the assembly, the pair of members 12,12' and 14,14' are free to pivot relative to one another about the coupling elements 18. Therefore, in order to stabilize the relative position of members 12,12' and 14,14', members 16,16' are interposed between members 14,14' and adjoined to members 12,12', two further coupling elements 18 having first been inserted in members 12,12' for positioning the members 16,16' thereagainst in the same way as above. Thereafter, the two coupling elements 20 are inserted into the through-holes provided in members 14,14' as well as in the registering through-holes provided in the interposed members 16,16' so as to lock members 16,16' in place, thereby providing a rigid and secure joint for all the members. In order to facilitate the insertion of the coupling elements 18, these are advantageously provided with chamfered end edges 22 and 22', as shown in FIG. 5; the coupling elements 20 may of course also have similar chamfered end edges.

The joint arrangement 10 may be easily dismantled by simply first removing the coupling elements 20 which serve to lock the members 16,16' in place; this may be achieved by using a similar coupling element which is coincidentally aligned with each element 20 and pushed against one end thereof so as to slidably displace a portion of the coupling element 20 exteriorily of one of the members 14,14' for grasping by one's fingers for purpose of retrieval. Where coupling elements 20' are used, as in the embodiment represented in FIG. 2A, such a procedure cannot of course be followed and the coupling elements 20' may be removed by forcing the tip of a screw or of a pointed object into the apparent end of each coupling element 20' so as to enable the withdrawal thereof by pulling. As a result, the members 16,16' are released from their locked position and can be removed by being separated in opposite directions along the length of members 14,14'. Thereafter, the other pairs of members 12,12' and 14,14' can be easily taken apart by simply separating the members 12,12'. The joint arrangement 10 can thus be readily dismantled manually without the use of special tools to provide a knocked-down structure for convenient storage or shipping, or for reassembly in a same or different arrangement.

Alternatively, the joint arrangement 10 may be dismantled by first removing only one of the coupling elements 20, instead of both as in the dismantling procedure outlined above. Thus, for example, the coupling element 20 which serves to lock member 16 in place can be first removed in order to release the member 16 for its locked position for purpose of removing same. Once the member 16 is removed, the end portions of the coupling elements 18 which protrude from the members 12,12' can then be grasped so as to remove these coupling elements and thereafter separate the members 12,12' thus liberated. Finally, the members 14,14' which are adjoined to member 16' via the other coupling element 20 can be taken apart.

When following such a dismantling procedure, it is apparent that the other coupling element 20 which serves to lock the member 16' in place need not extend entirely through either of the members 14,14' and, therefore, it can be replaced by a coupling element 18 so as to extend only partially through the members 14,14'. In order to assemble the joint arrangement 10 using such a coupling element 18 to replace one of the coupling elements 20, the dismantling procedure just described can simply be reversed. It is also apparent that the coupling element which is first removed and is associated with members 14,14', for instance, the one serving to lock member 16 in place, can be of the type shown in FIG. 2A, that is, a coupling element 20'.

It should be noted, however, that the dismantling procedure just described cannot of course be applied to the embodiment shown in FIG. 3A, where pairs of coupling elements 18A,18B are used to join the members 12,12' and 16,16' together.

Figure 4:
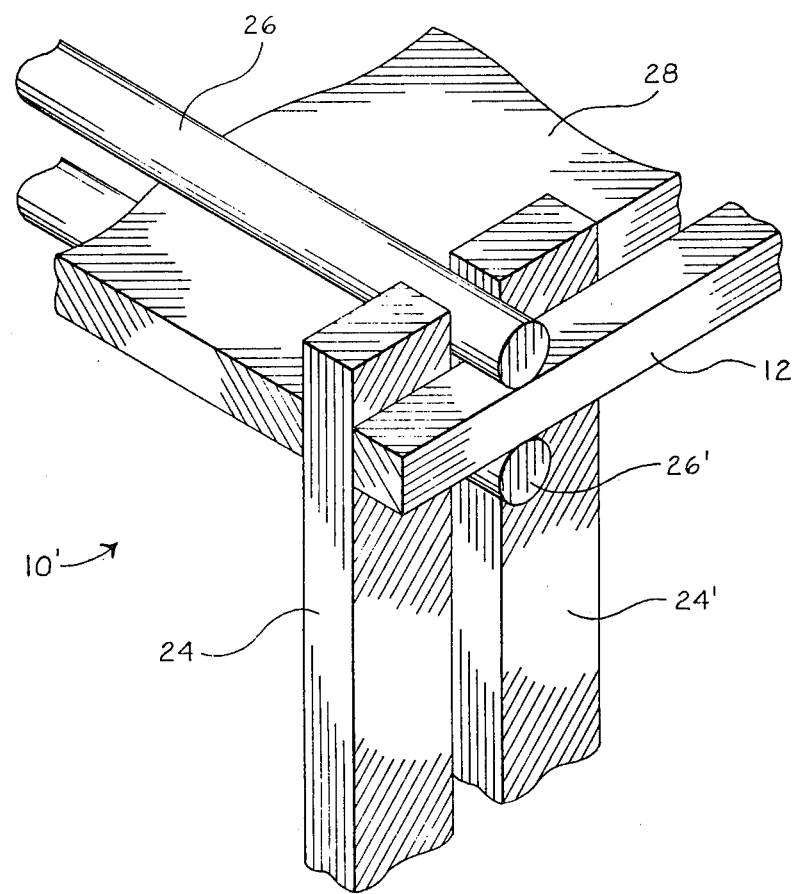
FIG. 4 is a view similar to that of FIG. 1, illustrating the application of a joint arrangement according to the invention.

Turning to FIG. 4 which illustrates a possible application of a joint arrangement as described above, there is shown a joint arrangement 10' which defines a corner of a table or shelf. The joint arrangement 10' is similar to that of FIG. 1, with the exception that the members 14,14' shown in FIG. 1 are now replaced by the leg members 24,24' of rectangular cross-section, the members 16,16' by the rods 26,26' of circular cross-section and the member 12' by the plate member 28 defining the tray portion of the table or shelf, while the member 12 of square cross-section is retained. It will be noted that the same coupling elements 18 and 20' as used in the embodiment of FIG. 2A are employed in the assembly of the joint arrangement 10', but that these are now totally inapparent. Indeed, the blind-holes and through-holes into which the coupling elements 20' are inserted are provided here respectively in leg members 24 and 24' so that the apparent ends of the coupling elements 20' face into the space defined between the member 12 and the plate 28 and are thus hidden from the general view.

It should also be noted that while in the particular embodiments shown the members of each pair lie in a respective plane and the three pairs of members are arranged relative to one another such that their respective planes intersect at right angles, two or all three pairs may equally be joined at angles other than 90°.

As it is apparent, the invention provides a joint arrangement which is rigid, strong and simple to assemble and which can also be easily disassembled.

Finally, it should be noted that, although the joint arrangement 10 has been illustrated with two coupling elements 20 which ensure a joint which is both rigid and secure, only one such coupling element 20 may be used in certain applications, for example, in the construction of tables, where the securing of the last positioned member of the third pair, for example member 16, is not absolutely necessary since the members of the third pair 16,16′ already provide sufficient rigidity to the joint. In such an embodiment, the member 16 would be retained in place by coupling elements 18 and by frictional engagement with the other members abutting thereagainst.

I claim:

1. A dismantable joint arrangement comprising only three groups of only two members in each group, said two members of each of said groups being oriented as pairs of spaced-apart parallel members, said pairs of members being arranged relative to one another such that the members of each pair cross the members of the other pairs in abutting engagement therewith and any one pair of members has a respective second pair of members interposed therebetween and a respective third pair of members adjoined thereto and interposed between the members of said respective second pair, and at least two dowell-type coupling elements associated with each pair for positioning the members thereof against those interposed therebetween, said coupling elements being removably inserted in corresponding holes formed at the crossings of said members and being slidably frictionally engaged in said holes so as to be retained therein by frictional force while being slidably removable by the application of manual force, the members of said respective third pair cooperating with the members of said one pair and said respective second pair to stabilize the relative position of said members and the coupling elements associated with said respective second pair releasably locking the members of said respective third pair in place to thereby provide a rigid and secure joint for all said members, whereby said joint arrangement may be dismantled by slidably removing at least one of the coupling elements associated with said respective second pair so as to release at least one of the members of said respective third pair and thereby enable the remaining members to be taken apart.

2. A joint arrangement as claimed in claim 1, wherein there are two said coupling elements associated with said respective second pair and disposed on either side of said one pair.

3. A joint arrangement as claimed in claim 2, wherein said coupling elements associated with said respective second pair are each inserted in through-holes formed in the members of said respective second pair and registering with through-holes formed in the members of said respective third pair whereby to extend entirely through said members.

4. A dismantable joint arrangement comprising three pairs of spaced-apart parallel members, said pairs of members being arranged relative to one another such that the members of each pair cross the members of the other pairs in abutting engagement therewith and any one pair of members has a respective second pair of members interposed there-between and a respective third pair of members adjoined thereto and interposed between the members of said respective second pair, and at least two dowell-type coupling elements associated with each pair for positioning the members thereof against those interposed therebetween, said coupling elements being removably inserted in corresponding holes formed at the crossings of said members and being slidably frictionally engaged in said holes so as to be retained therein by frictional force while being slidably removable by the application of manual force, the members of said respective third pair cooperating with the members of said one pair and said respective second pair to stabilize the relative position of said members and the coupling elements associated with said respective second pair releasably locking the members of said respective third pair in place to thereby provide a rigid and secure joint for all said members, whereby said joint arrangement may be dismantled by slidably removing at least one of the coupling elements associated with said respective second pair so as to release at least one of the members of said respective third pair and thereby enable the remaining members to be taken apart;

wherein there are two said coupling elements associated with said respective second pair and disposed on either side of said one pair;

wherein said coupling elements associated with said respective second pair are each inserted in a through-hole formed in one member of said respective second pair and in a blind-hole formed in the other member of said respective second pair, said through-hole and blind-hole registering with a through-hole formed in each member of said respective third pair, whereby each said coupling element extends entirely through said one member of said respective second pair and said member of said respective third pair and partially through said other member of said respective second pair.

5. A joint arrangement as claimed in claims 3 or 4, wherein there are two said coupling elements associated with each said one pair and said respective third pair and disposed respectively on either side of said respective third pair and said respective second pair, each said coupling element being inserted in blind-holes formed in the members of its associated pair and registering with a through-hole formed in each member interposed between said associated pair, whereby each said coupling element extends partially through the members of its associated pair and entirely through the interposed member.

6. A dismantable joint arrangement comprising three pairs of spaced-apart parallel members, said pairs of members being arranged relative to one another such that the members of each pair cross the members of the other pairs in abutting engagement therewith and any one pair of members has a respective second pair of members interposed there-between and a respective third pair of members adjoined thereto and interposed between the members of said respective second pair, and at least two dowell-type coupling elements associated with each pair for positioning the members thereof against those interposed therebetween, said coupling elements being removably inserted in corresponding holes formed at the crossings of said members and being slidably frictionally engaged in said holes so as to be retained therein by frictional force while being slidably removable by the application of manual force, the members of said respective third pair cooperating with the members of said one pair and said respective second pair to stabilize the relative position of said members and the coupling elements associated with said respective second pair releasably locking the members of said respective third pair in place to thereby provide a rigid and secure joint for all said members, whereby said joint arrangement may be dismantled by slidably removing at least one of the coupling elements associated with said respective second pair so as to release at least one of the members of said respective third pair and thereby enable the remaining members to be taken apart;

wherein there are two said coupling elements associated with each said one pair and said respective third pair and disposed respectively on either side of said respective third pair and said respective second pair, each said coupling element being inserted in blind-holes formed in the members of its associated pair and registering with a through-hole formed in each member interposed between said associated pair, whereby each said coupling element extends partially through the members of its associated pair and entirely through the interposed member.

7. A joint arrangement as claimed in claim 6, wherein there are two said coupling elements associated with said respective second pair and disposed on either side of said one pair, and wherein one of said coupling elements is inserted through-holes formed in the members of said respective second pair and registering with a through-hole formed in one member of said respective third pair whereby to extend entirely through said members, the other coupling element being inserted in blind-holes formed in the members of said respective second pair and registering with a through-hole formed in the other member of said respective third pair, whereby said other coupling element extends partially through said members of said respective second pair and entirely through said other member of said respective third pair.

8. A joint arrangement as claimed in claim 6, wherein there are two said coupling elements associated with said respective second pair and disposed on either side of said one pair, and wherein one of said coupling elements is inserted in a through-hole formed in one member of said respective second pair and in a blind-hole formed in the other member of said respective second pair, said through-hole and blind-hole registering with a through-hole formed in one member of said respective third pair, whereby said one coupling element extends entirely through said one member of said respective second pair and said one member of said respective third pair and partially through said other member of said respective second pair, the other coupling element being inserted in blind-holes formed in the members of said respective second pair and registering with a through-hole formed in the other member of said respective third pair, whereby said other coupling element extends partially through said members of said respective second pair and entirely through said other member of said respective third pair.

9. A dismantable joint arrangement comprising three pairs of spaced-apart parallel members, said pairs of members being arranged relative to one another such that the members of each pair cross the members of the other pairs in abutting engagement therewith and any one pair of members has a respective second pair of members interposed there-between and a respective third pair of members adjoined thereto and interposed between the members of said respective second pair, and at least two dowell-type coupling elements associated with each pair for positioning the members thereof against those interposed therebetween, said coupling elements being removably inserted in corresponding holes formed at the crossings of said members and being slidably frictionally engaged in said holes so as to be retained therein by frictional force while being slidably removable by the application of manual force, the members of said respective third pair cooperating with the members of said one pair and said respective second pair to stabilize the relative position of said members and the coupling elements associated with said respective second pair releasably locking the members of said respective third pair in place to thereby provide a rigid and secure joint for all said members, whereby said joint arrangement may be dismantled by slidably removing at least one of the coupling elements associated with said respective second pair so as to release at least one of the members of said respective third pair and thereby enable the remaining members to be taken apart;

wherein there are two pairs of said coupling elements associated with each said one pair of members and said respective third pair of members and disposed respectively on either side of said respective third pair and said respective second pair, each said coupling element being inserted in a blind-hole formed in each member of its associated pair and registering with a blind-hole formed in each member interposed between said associated pair, whereby each said coupling element extends partially through each member of its associated pair as well as through the interposed member.

10. A joint arrangement as claimed in claim 1, wherein said at least two coupling elements associated with each said pair of members are parallel with one another and the coupling elements associated with any one pair of members lie in a different plane in relation to those associated with the other pairs of members.

11. A joint arrangement as claimed in claim 1, wherein each said coupling element is elongated and has a circular cross-section.

12. A joint arrangement as claimed in claim 11, wherein each said coupling element has chamfered end edges.

13. A joint arrangement as claimed in claim 1, wherein the members of each pair lie in a respective plane and said three pairs of members are arranged relative to one another such that their respective planes intersect are right angles.

14. A dismantable joint arrangement comprising only three groups of only two members in each group, said two members of said groups being oriented as pairs of spaced-apart parallel members, said pairs of members being arranged relative to one another such that the members of each pair cross the members of the other pairs in abutting engagement therewith and any one pair of members has a respective second pair of members interposed therebetween and a respective third pair of members adjoined thereto and interposed between the members of said respective second pair, and dowell-type coupling elements positioning the members of each pair against those interposed therebetween, there being at least one said coupling element associated with said respective second pair and at least two said coupling elements associated with each of said one pair and said respective third pair, said coupling elements being removably inserted in corresponding holes formed at the crossings of said members and being slidably frictionally engaged in said holes so as to be retained therein by frictional force while being slidably removable by the application of manual force, the members of said respective third pair cooperating with the members of said one pair and said respective second pair to stabilize the relative position of said members and said at least one coupling element associated with said respective second pair releasably locking at least one of the members of said respective third pair in place to thereby provide a rigid joint for all said members.

* * * * *